United States Patent [19]
Smith et al.

[11] Patent Number: 4,826,693
[45] Date of Patent: May 2, 1989

[54] MANUFACTURE OF CHEESE FLAVOR POWDER

[76] Inventors: Paul F. Smith, 6 Barton Road, Clayton South, Victoria; Donald W. Geals, 16 Zarro Street, Scoresby, Victoria, both of Australia

[21] Appl. No.: 24,241

[22] Filed: Mar. 10, 1987

Related U.S. Application Data

[63] Continuation-in-part of Ser. No. 792,452, Oct. 29, 1985, abandoned.

[51] Int. Cl.$^4$ .................... A23C 19/086; A23C 19/00; A23C 9/00
[52] U.S. Cl. .......................... 426/34; 426/36; 426/39; 426/40; 426/61; 426/582; 426/650; 426/35
[58] Field of Search ............... 426/35, 34, 36, 98, 426/588, 40, 42, 38, 39, 41, 580, 587, 650, 588, 582, 61, 63, 800–801

[56] References Cited

U.S. PATENT DOCUMENTS

| | | | |
|---|---|---|---|
| 3,635,737 | 1/1972 | Baron | 99/140 |
| 3,674,508 | 7/1972 | Kasik et al. | 99/140 |
| 3,765,905 | 10/1973 | Kasik et al. | 99/140 |
| 4,414,229 | 11/1983 | Bakal et al. | 426/98 |

FOREIGN PATENT DOCUMENTS

| | | |
|---|---|---|
| 29539 | of 1977 | Australia . |
| 6380 | 9/1980 | European Pat. Off. . |
| 1133533 | 11/1968 | United Kingdom . |

Primary Examiner—Marianne Cintins
Attorney, Agent, or Firm—Knobbe, Martens, Olson & Bear

[57] ABSTRACT

A process for manufacturing cheese flavor powder is disclosed wherein unpasteurized standardized milk containing cheese flavor components is heated and thereafter converted to a powder.

34 Claims, 1 Drawing Sheet

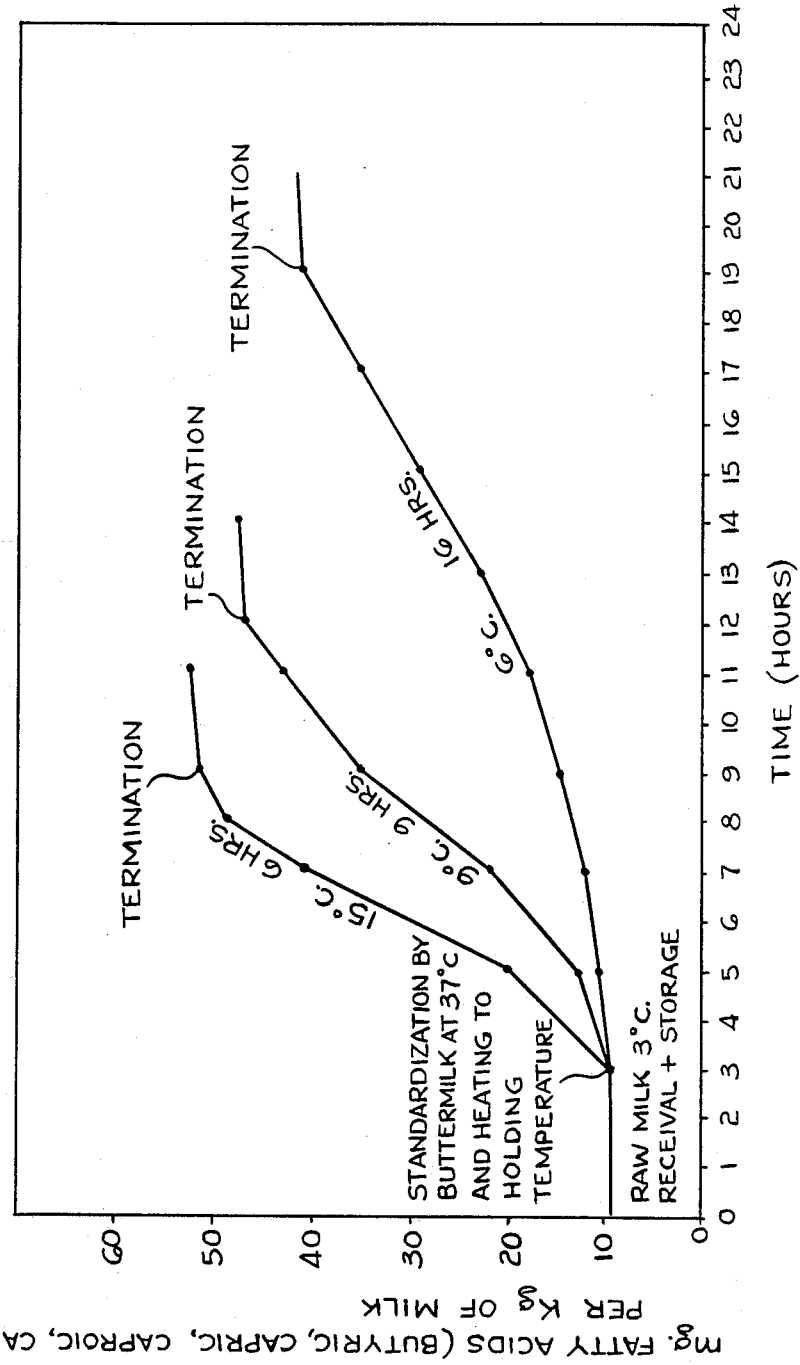

MANUFACTURE OF CHEESE FLAVOR POWDER

CROSS-REFERENCE TO RELATED APPLICATION

This application is a Continuation-in-part of copending U.S. Ser. No. 792,452, filed Oct. 29, 1985 now abandoned;

BACKGROUND OF THE INVENTION

This invention relates to the manufacture of cheese flavour powder.

Cheese flavour powder is conventionally produced by macerating a selected cheese or mix of cheeses, rendering in measured amounts of hot water together with various other food grade ingredients, and raising the mix to pasteurising/emulsification temperatures prior to feeding to a conventional spray drier from which the resultant powder is collected and bagged.

This conventional process suffers from a number of disadvantages as follows:

1. Cheese varies considerably in flavour profiles and physical properties and requires careful selection and processing in order that end flavour and physical properties are sufficiently protected to meet consumer requirements.

Under the most controlled conditions, end flavour is variable and its intensity cannot be assured.

2. For large scale manufacture of cheese flavour powder a considerable inventory of cheese is required, creating cost pressures in financing and storing bulk cheese for long periods under controlled temperatures demanding refrigeration, and in costly insulated storage areas.

3. Labour costs of the overall process are high; cheese must be decartoned, unwrapped, cut and macerated prior to feeding to the mixing tank.

4. Addition of ingredients such as whey powder to the formulated mix requires the addition of more water before drying at a solids concentration of about 40%, thereby substantially increasing energy costs of batch preparation and eventual spray drying.

5. Such a process also requires the use of sodium based emulsifying salts, resulting in increased sodium levels in the end product.

6. Heat treatment associated with rendering macerated cheese and other formulated ingredients causes substantial flavour losses due to the volatility of most naturally occurring cheese flavour compounds, because of the absence in the mix of sufficient suitable proteins or other encapsulating substances, which would prevent their escape.

7. Furthermore, the extent of heat treatment required for rendering, emulsifying and pasteurising the mix tends to further denature the available protein, and may cause oiliness, eventual flavour deterioration due to oxidation of the fat, and a tendency for the powder to lump under storage conditions.

It is an object of the invention to provide an improved process for the production of cheese flavour powder.

The invention accordingly provides a process for manufacturing cheese flavour powder comprising:

storing a volume of unpasteurized whole milk under substantially continuous agitation for a time and at a temperature such as to accelerate lipolysis of triglycerides in the milk by enzymes naturally present in the milk to release short chain fatty acids, including at least butyric, caproic, caprylic and capric acids and their derivative aldehydes and ketones, which are the principal components of cheese flavour;

then heating the milk to a temperature sufficient to substantially de-activate said enzymes and thus cause said lipolysis to substantially cease, and to cause previously uncoagulated whey protein naturally occurring in the unpasteurized milk to encapsulate said short chain fatty acids and their derivative aldehydes and ketones, thereby facilitating subsequent conversion to powder; and converting the resultant product to a powder.

The invention is also directed to a cheese flavour powder in which the components of the cheese flavour, being the short chain fatty acids butyric caproic, caprylic and capric acids and their derivative aldehydes and ketones, are encapsulated by uncoagulated whey proteins. In a preferred aspect, the invention affords a cheese flavour powder manufactured by the aforedescribed process.

Using this process, it is possible to substantially reduce the use of cheese and hence the attendant storage and handling problems. The short chain fatty acids, which together with their derivative aldehydes and ketones are the principal components of cheese flavour and comprise in particular butyric, caproic, caprylic and capric acids, are volatile and liable to be readily lost in processing involving cheese maturing, storage and maceration, but are preserved and enhanced in the final product by processing directly into cheese flavour powder in accordance with the invention. The inventors have appreciated that, of the components identified at various times with cheese flavour, it is the specified short chain fatty acids and their derivatives which are the dominant determinants of a rounded cheese flavour. Moreover, the process of the invention avoids the coagulation of the milk proteins which normally occurs in the manufacture of cheese. Whey proteins in particular, because of their long chain hydrophilic structure, are excellent encapsulants and an adequate level of such material is essential for the successful retention of flavour during conversion of the mix to a dried powder. Without effective encapsulating material most volatile cheese flavouring acids would be lost in subsequent processing and storage. Because of the absence of adequate contained encapsulating material, the traditional process for the production of cheese flavour powder requires the addition of emulsifiers, such as sodium based emulsifying salts, which result in undesirable levels of sodium or call for expensive caseinate ingredients.

As indicated, the inventive process includes treating unpasteurized whole milk to enhance lipolysis of the triglycerides in the milk. A preferred novel feature of the invention is the utilisation for this purpose of the enzymes naturally present in the milk, for example naturally occurring enzymes or incidental bacterial enzymes, and particularly the lipolytic enzymes capable of hydrolysing fats and oils and thus liberating fatty acids including the aroma producing short chain fatty acids present in the milk fat. Because of possible health hazards, milk for public consumption, including most milk for cheese manufacture, has to be subjected to pasteurisation, a heat treatment designed to destroy pathogenic micro-organisms which may be incidentally present in the milk. It happens, however, that the pasteurisation treatment either substantially or totally inactivates the lipolytic enzymes and also other beneficial bacterial enzymes present in the milk, thus rendering the milk substantially inert as a medium for biochemical change.

This deleterious affect of pasteurisation on cheese flavour has been recognised and to counteract it, lipolytic enzyme preparations, derived from kids' or lambs' throat glands, have been introduced as additives to the milk in the manufacture of numerous cheese varieties, in order to promote the release of the short chain fatty acids, necessary for a full cheese flavour spectrum. In accordance with the invention, however, such additions are unnecessary as raw i.e. unpasteurised milk is treated to enhance lipolysis: pasteurisation can be effected if desired at any later convenient stage.

As indicated, the other principal feature of the invention is the utilisation of whey proteins as an encapsulating material, which, being non-volatile, holds the volatile flavour components within the product. Because the whey proteins are not coagulable by rennet, most of them are lost in the whey in the traditional cheese making process and therefore are not present in the cheese in sufficient amounts to serve as flavour encapsulants. Yet, because of their nature, they are eminently suitable for this function. In fact, they are considered more effective than most of the gums employed by flavour essence manufacturers for this purpose. But it is not only the structure of the whey proteins that renders them so useful for encapsulation. It is also their response to heat: the colloidal particles of the whey proteins tend to coalesce when heated. The invention provides a process by which this potential utility of the natural whey proteins can be realized.

In the process of coalescing, the whey proteins aggregate, locking within their framework the free cheese flavour components and thus preventing their escape into the atmosphere.

It is known that the whey proteins have effectively encapsulated the butterfat component, including the specified short chain fatty acids and their derivatives, because:

1. The free flowing nature of the powder produced without need of emulsifying agents (dispersing agents) and without homogenisation indicates encapsulated fat. This can be confirmed by microscopic examination of the powder particles.

2. The resultant strong and rounded cheese flavour further indicates the retention of the highly volatile said free fatty acids and their derivative aldehydes and ketones.

Utilising temperatures below those known to coagulate whey proteins, produces a less intense cheese flavour powder which exhibits a tendency to lumping.

Microscopic examination of the powder reveals free fat, and analysis for the said fatty acids shows a significant reduction in levels from those achieved by processing within the required ranges of the invention.

3. Determination of Whey Protein Nitrogen Index by analysis (a recognised measurement of the amount of undenatured serum protein remaining in the powder) at the various process stages shows conclusively the coagulation of the proteins, thus effecting encapsulation as described.

In addition, determination of Solubility Index measurements show a decrease in solubility i.e. a reduction in soluble protein, when the inventive technique is applied. The use of lower temperatures results in a higher solubility indicating a reduced level of protein coagulation has occurred.

The proportion of the listed short chain fatty acids achieved by the lipolysis step is advantageously in the range 40–55 mg per kg of treated milk, most preferably 45–50 mg/kg.

Said substantially continuous agitation is preferably at least sufficient to disturb the surface of the milk but may be vigorous agitation, for example agitation by stirring sufficient to break the surface of the milk. It is normal practice to gently stir milk in storage with a slow blade, to prevent fat separation, but such stirring is not sufficient to disturb the surface of the milk. In the present process, agitation disrupts the fat globule membrane and facilitates the action of naturally occurring lipase enzyme in exerting a hydrolysing influence on the contained fat triglycerides, releasing the four short chain fatty acids and their derivative aldelydes and ketones.

A preferred temperature for accelerating lipolysis is in the range 6°–15° C. and a preferred storage period is in the range 6–16 hours. Normal milk storage temperature is 3–4° C. Below 6° C., the lipolysis process is unacceptably slow. If the temperature exceeds 15° C. degradation such as uncontrolled fat splitting begins to occur: the butterfat re-agglomerates and lumps of butter begin to form. A storage period below 6 hours results in an inadequate level of lipolysis while storage for more than 16 hours results in the general quality of the milk deteriorating to unacceptable levels. Such lengthy storage is in any event of no additional advantage and thus becomes unjustifiable on economic grounds.

There is a close relationship between the temperature and storage period in the lipolysis stage of the process, which is demonstrated in the accompanying drawing. This drawing depicts three exemplary processes according to the invention, indicating short chain fatty acid levels against elapsed time at three different temperatures. The received unpasteurized milk was stored at 3° C. for 3 hours and lipolysis instituted by standardization with warm buttermilk at 37° C.

The milk treated as just described, with or without extra ingredients, may then be subjected to evaporation by heat until the desired solids content is achieved. Most preferably, such heating is to a temperature in the range 75–85° C. and the most preferred solids content is in the range 40–50%. It is during this heat treatment and consequent concentration of the mix into a smaller volume, that there occurs the aforedescribed encapsulation by the whey proteins of the cheese flavour components. It is also noted that this heat treatment should destroy any pathogenic micro-organisms and thus may be viewed as a delayed but effective pasteurization.

In an alternative embodiment, the heat treatment to de-activate the enzymes and cause encapsulation of the short chain fatty acids is effected in two stages, viz a first heating to about 70° C. to slow the lipolysis and to start the encapsulation, and then a second heating to about 80° C. immediately prior to conversion to a powder. The second heating wholly stops lipolysis, completes the encapsulation, and substantially totally destroys pathogenic micro-organisms present in the milk.

The unpasteurized milk treated in accordance with the invention is typically raw whole milk standardised to a desired total solids to fat ratio, for example by addition of buttermilk or unpasteurized cream. Standardization is necessary to achieve the specification of the end-product sought, and take account of the usual seasonal and geographic variations in the milk utilized for the process.

The standardized total solids to fat ratio will of course vary but advantageously does not exceed 6.5 by weight, that is, the total fat proportion present should be at least 15%. The butterfat content is preferably about 3.7–6.0%, most preferably 4.0–4.7%.

It is highly advantageous to standardize with buttermilk at a temperature higher than that of the whole milk. This is useful in initiating the lipolysis. The greater the temperature difference, the sharper the effect: a buttermilk temperature in the region of 35°–40° C. is favoured.

Advantageously, the treated milk, preferably as said concentrate and preferably with agitation, is mixed with an amount of selected natural cheese, preferably in the range 1–7.5% on a total solids basis, and/or of an enzyme-modified cheese, preferably 0.5–10% on a total solids basis, prior to said conversion to a powder, in order to heighten desirable flavour characteristics in the powder.

To the treated milk may be added skim milk, buttermilk or blends thereof or reconstituted or re-wetted whole milk, skim milk, buttermilk, butter oil or blends thereof.

Food grade acids, for example food grade lactic, proprionic, acetic or citric acids, may be added to the concentrate for flavour purposes and for adjustment of the pH to a preferred range 5.2–5.7. The mix may then be pumped via a colloiding system for intimate integration and is preferably maintained at a temperature between 50° and 70° C., most preferably about 60° C., prior to conversion to a powder.

The conversion of the mix to a powder is preferably effected in a spray drier of conventional construction, to which the aforesaid integrated heated mix may be fed after retention in a holding silo under constant agitation for a preferred period of between two and four hours. The dwell period in the holding silo provides sufficient time to allow the protein phase to further hydrate, and to ensure total integration of the additives included to meet the desired specification. This further intensifies the base flavour present in the milk concentrate and improves the quality of the spray dried flavouring.

The advantages of the process of the invention are substantial. First and foremost, the financial outlay for the purchase and the storing of substantial quantities of cheese is avoided: for example, 90% less cool room space may be required. By processing with a higher solids contents in the mix, higher throughput and significant energy savings can be obtained. A substantial quantity of cheese, a costly product, is eliminated.

There are substantial savings in labour costs as the decartoning, unwrapping and then cleaning of substantial quantities of cheese, and considerable waste disposal problems, are avoided. In general, the process of the invention substantially eliminates the need for human involvement in the handling of the product and allows a stricter control of the processing environment. The process substantially reduces off-flavours which may arise in flavourings produced in conventional cheese based processes.

It is estimated that the cost benefits relative to the traditional process are at least of the order of 50%.

As earlier indicated, the invention permits the use of reconstituted or re-wetted whole milk, skim milk or buttermilk powders or blends thereof, in substantial amounts. The process may also be effected with or without additions of part hydrogenated vegetable oil, salt, colour, spices, together with small amounts of enzyme modified cheeses and/or small amounts of selected natural cheese to adjust the final flavour to desirable profiles largely determined by end use or customer preference.

It should also be understood that the process of the invention is applicable to the use of polyunsaturated milk, whether obtained by altering the milch animal's metabolism to incorporate polyunsaturated fatty acids or vegetable oils, or by admixing such acids or oils to the milk or the mix.

EXAMPLE 1

Cheddar cheese flavour powder for use in snack foods, with a final desired specification of 24% butterfat and 7% sodium chloride, was produced as follows:

Raw unpasteurized whole milk previously held at 4° C. was standardized by the addition of buttermilk at 37° C. to a total solids to fat ratio of 9.6 to 2.65. The thus standardized milk was held for six hours at 9° C. under constant agitation, then heated to 75° C. in a plate heat exchanger and concentrated in a triple effect evaporator to 45% total solids. The concentrate left the evaporator at 37° C. and was fed to a mixing facility. It should be noted at this point that concentration of the milk might equally be achieved by ultrafiltration at suitable temperatures.

After a holding time of 75 minutes, the quantity of total milk solids in the mix was determined and, on a total solids basis, 1.7% of selected enzyme-modified cheese solids and 4% of selected natural cheese solids were added to the milk concentrate. An appropriate amount of salt was separately dissolved then pumped into the concentrate mix. A measured amount of a food grade organic acid, a blend of lactic and citric acids, was diluted five-fold and added to achieve a pH of 5.6.

The concentrate mix was then passed through a colloid mill for final integration and reheated in a tubular heat exchanger to 60° C. en route to a tank where it was held for two hours. The product was then delivered to a conventional spray dryer fed by a high pressure pump. The product was heated to 85° C. as it was delivered to the dryer, to complete pasteurization, to ensure completion of encapsulation, and to assist in optimizing dryer efficiency.

The powder was found to be free-flowing despite the absence of emulsifying agents for the final mix and despite absence of homogenisation. Microscopic examination revealed absence of free fat. The whey protein nitrogen index and solubility index of the powder were determined by analysis during the process as detailed above: the results indicated the coagulation of the whey proteins to effect encapsulation. This was consistent with the view that uncoagulated whey proteins were the principal vehicle present capable of encapsulating the flavour components. The final moisture content of the powder was 3.5%=0.5%.

Allowing 48 hours for product and flavour stabilization, the product was organoleptically evaluated and compared with a product made by conventional methods and of similar composition. The following table compares the fatty acids present in mg/kg of total solids for the cheese flavour powder produced according to the example and a commercial cheddar cheese flavoured powder produced by conventional methods from macerated cheese.

TABLE 1

Fatty acids present, expressed in mg/kg of total solids.

| SAMPLE | BUTYRIC | CAPRIC | CAPROIC | CAPRYLIC |
|---|---|---|---|---|
| Standard process cheese powder | 40 | 65.5 | 20 | 20 |
| Product made by claimed process | 135 | 112.5 | 77.5 | 65 |

The trial product was found to have a full and true cheddar cheese flavour with a pleasing aftertaste and was preferred by tasters to the commercial product mentioned above which had a blander flavour.

EXAMPLE 2

A swiss cheese flavour powder with a final desired specification of 23% butterfat and 4% sodium chloride was produced as follows:

Raw unpasteurized whole milk previously held at 4° C. was standardized by the addition of buttermilk at 38° C. to the appropriate desired total solids to fat ratio.

This standardized milk was held for seven (7) hours at 12° C. under constant agitation, preheated to 75° C. in a plate heat exchanger and concentrated in a triple effect evaporator to 42.6% total solids.

The concentrate left the evaporator at 37° C., the quantity of total milk solids in the mix was determined and, on a total solids basis, 2.4% of selected enzyme-modified swiss cheese solids and 3% of selected natural swiss cheese solids were added to the concentrate. An appropriate amount of salt was separately dissolved and added to the concentrate mix.

A measured amount of a food grade organic acid, a blend of proprionic and lactic acids, was diluted five fold and added to achieve a pH of 5.6.

The concentrate mix was then passed through a colloid mill and reheated in a tubular heat exchanger to 60° C. and held for 4 hours. The product was then spray dried, in a conventional spray dryer fed by high pressure pump, to a final moisture of 3.8. The product was heated to 85° C. as it was delivered to the dryer, to complete pasteurization, to ensure completion of encapsulation, and to assist in optimizing dryer efficiency.

The powder was found to be free-flowing despite the absence of emulsifying agents for the final mix and despite absence of homogenisation. Microscopic examination revealed absence of free fat. The whey protein nitrogen index and solubility index of the powder were determined by analysis during the process as detailed above: the results indicated the coagulation of the whey proteins to effect encapsulation. This was consistent with the view that uncoagulated whey proteins were the principal vehicle present capable of encapsulating the flavour components.

Allowing 48 hours for product and flavour stabilisation the product was organoleptically evaluated and was found to be a fine textured powder having a very distinctive swiss cheese flavour and aroma.

EXAMPLE 3

A Bleu cheese flavour powder with a final desired specification of 28.5% butterfat and 5.6% sodium chloride was produced as follows:

Raw unpasteurized milk previously held at 4° C. was standardized by the addition of unpasteurized cream at 38° C. to the appropriate desired total solids to fat ratio.

After holding for thirteen (13) hours at 7° C. under constant agitation the standardized milk was preheated to 75° C. and concentrated to 46.5% total solids.

The concentrate left the evaporator at 37° C. and after a holding time of 75 minutes the quantity of total solids in the mix was determined and, on a total solids basis, 2.6% of selected enzyme modified Bleu cheese solids and 7% of selected natural Bleu cheese solids were added. An appropriate amount of salt was added to the concentrate mix.

The pH of the mix was corrected to 5.8 by the addition of lactic acid diluted five fold.

The mix was colloided, preheated to 60° C. and held for 2 hours. The product was then spray dried to a final moisture of 3.4%. The product was heated to 85° C. as it was delivered to the dryer, to complete pasteurization, to ensure completion of encapsulation, and to assit in optimizing dryer efficiency.

The powder was found to be free-flowing despite the absence of emulsifying agents for the final mix and despite absence of homogenisation. Microscopic examination revealed absence of free fat. The whey protein nitrogen index and solubility index of the powder were determined by analysis during the process as detailed above: the results indicated the coagulation of the whey proteins to effect encapsulation. This was consistent with the view that uncoagulated whey proteins were the principal vehicle present capable of encapsulating the flavour components.

After 48 hours, the product was found to have a very distinctive bleu cheese flavour, aroma, and a pleasant textured mouth feel.

Whilst the examples just provided describe the production of cheddar, swiss and bleu cheese flavour powders, the process is equally applicable to the production of cheese flavour powders having the flavour characteristics of most known cheese types, e.g. Gouda, Ramoni, Parmesan, by factorial control of the variables embodied in the process.

Similarly, the production of cultural flavour cheese powders may be achieved by the inventive process by the addition of suitable cultured dairy products in place of or in addition to the described preferred step of adding a relatively small amount of selected natural cheese and/or of an enzyme-modified cheese. The cultural dairy products may be cultured sour cream, in the range of 5-15% on a total solids basis, cultured buttermilk in the range of 5-15% on a total solids basis, or yoghurt, in the range of 2-10% on a total solids basis.

Further experiments have shown that powders produced by the process of the invention are highly suited as a cheese coating for snack foods, either singularly or as a component base in specialised blended coatings. With slight compositional changes to suit individual and user requirements, they are also highly suited for use in bakery goods, in soups, sauces and general prepared foods.

We claim:

1. A process for manufacturing cheese flavour powder, comprising:
   storing a volume of unpasteurized standardized whole milk under substantially continuous agitation for at least about six hours and at a temperature of from about six degrees to about 15 degrees C to accelerate lipolysis of triglycerides in the milk by enzymes naturally present in the milk, thereby generating a sufficiently increased level of cheese flavour components comprising one or more of butyric, caproic, caprylic or capric acids or derivative aldehydes or ketones thereof to create a cheese flavour;

thereafter heating the milk to a temperature sufficient to substantially deactivate said enzymes and thus cause said lipolysis to substantially cease, and to cause previously uncoagulated whey protein naturally occurring in the unpasteurized milk to encapsulate said short-chain fatty acids and their derivative aldehydes and ketones, thereby facilitating subsequent conversion to a powder; and converting the resultant product to a powder.

2. A process according to claim 1 wherein the time of said storage is in the range 6 to 16 hours.

3. A process according to claim 1 wherein said substantially continuous agitation is such as to disturb the surface of the milk.

4. A process according to claim 1 wherein the solids content of said resultant product prior to said conversion to powder is in the range 40-50%.

5. A process according to claim 1 wherein said unpasteurized whole milk is raw whole milk standardized to a preselected total solids to fat ratio.

6. A process according to claim 5 wherein the raw whole milk is standardized by adding buttermilk at a temperature higher than that of the whole milk.

7. A process according to claim 6 wherein the temperature of the added buttermilk is in the range 35°-40° C.

8. A process according to claim 5 wherein the standardized total solids to fat ratio does not exceed 6.5 by weight.

9. A process according to claim 5 wherein the butterfat content of the standardized raw whole milk is in the range 3.7-6.0% by weight.

10. A process according to claim 1 further including mixing the milk after said lipolysis with an amount of selected natural cheese prior to said conversion to a powder.

11. A process according to claim 12 wherein said amount of selected natural cheese is in the range 1 to 7.5% on a total solids basis.

12. A process according to claim 1 further including adding a food grade acid to the milk before said heating step to achieve a pH in the range 5.2-5.7.

13. A process according to claim 1 wherein said heating to de-activate the enzymes and to cause encapsulation is to a temperature of about 75°-85° C.

14. A process according to claim 13 wherein, apart from said heating to about 75° C.-85° C., the milk is maintained at a temperature in the range 50°-70° C. prior to said conversion to a powder.

15. A process according to claim 1 wherein said conversion to a powder is effected in a spray dryer.

16. A process according to claim 5 wherein said milk is stored for between two and four hours before being fed to the spray dryer.

17. A process according to claim 5 further including mixing the milk after said lipolysis with a cultured dairy product whereby to produce a cultural flavour cheese powder.

18. A process according to claim 1 including heating the milk after said lipolysis but prior to said conversion to a powder to a temperature sufficient to totally destroy pathogenic micro-organisms present in the milk.

19. A process according to claim 1 wherein the concentration of said short chain fatty acids achieved by said lipolysis is in the range 40 to 55 mg per kg of the treated milk.

20. A process according to claim 1 further including mixing the milk after said lipolysis with an amount of an enzyme-modified cheese prior to said conversion to a powder.

21. A process according to claim 20 wherein said enzyme-modified cheese is added in an amount in the range 0.5-10% on a total solids basis.

22. A process for manufacturing cheese flavour powder, comprising:

providing unpasteurized standardized milk containing 40 to 55 mg per kg of milk of cheese flavour components comprising one or more of butyric, caproic, caprylic or capric acids or their derivative aldehydes or ketones to create a cheese flavour;

heating the milk to a temperature sufficient to cause previously uncoagulated whey protein naturally occurring in the unpasteurized milk to encapsulate said cheese flavour components, thereby facilitating subsequent conversion to powder; and converting the resultant product to a powder.

23. A process according to claim 22, wherein the solids content of said resultant product prior to said conversion to powder is in the range of 40%-50%.

24. A process according to claim 22, further comprising mixing the milk with an amount of selected natural cheese prior to said conversion to a powder.

25. A process according to claim 24, wherein said amount of selected natural cheese is in the range of 1%-7.5% on a total solids basis.

26. A process according to claim 22, further including adding a food grade acid to the milk before said heating step to achieve a pH in the range of 5.2-5.7.

27. A process according to claim 22, wherein said heating to cause encapsulation is to a temperature of about 75°-85° C.

28. A process according to claim 27, wherein in addition to said heating to about 75°-85° C., the process further comprises maintaining at a temperature in the range of 50°-70° C. prior to said conversion to a powder.

29. A process according to claim 22, wherein said conversion to a powder is effected in a spray dryer.

30. A process according to claim 32, wherein said milk is stored for between 2-4 hours before being fed to the spray dryer.

31. A process according to claim 22, wherein said treatment includes mixing the milk with a cultured dairy product, whereby to produce a cultural flavour cheese powder.

32. A process according to claim 22, including heating the milk prior to said conversion to a powder to a temperature sufficient to totally destroy pathogenic microorganisms present in the milk.

33. A process according to claim 22, further comprising mixing the milk with an amount of an enzyme-modified cheese prior to said conversion to a powder.

34. A process according to claim 33, wherein said enzymemodified cheese is added in an amount in the range of 0.5%-10% on a total solids basis.

* * * * *